US007888898B2

(12) United States Patent
Wilkerson

(10) Patent No.: US 7,888,898 B2
(45) Date of Patent: Feb. 15, 2011

(54) CONTAINER WITH AUTOMATED LID FEATURE

(75) Inventor: Jack Randal Wilkerson, Umatilla, FL (US)

(73) Assignee: IPS Industries, Inc., Cerritos, CA (US)

( * ) Notice: Subject to any disclaimer, the term of this patent is extended or adjusted under 35 U.S.C. 154(b) by 377 days.

(21) Appl. No.: 12/231,831

(22) Filed: Sep. 5, 2008

(65) Prior Publication Data

US 2010/0059515 A1 Mar. 11, 2010

(51) Int. Cl.
*G05B 5/00* (2006.01)

(52) U.S. Cl. ........................ 318/460; 318/466; 318/467; 318/468; 318/469; 318/470; 220/260

(58) Field of Classification Search ................. 318/460, 318/466–470; 220/260
See application file for complete search history.

(56) References Cited

U.S. PATENT DOCUMENTS 5,477,980 A * 12/1995 Chaffin ....................... 220/715
6,412,661 B1 * 7/2002 Hannah, Sr. ................ 222/111
6,557,717 B1 * 5/2003 Keck ....................... 220/254.9
6,986,435 B2 * 1/2006 Sagal et al. .............. 220/592.2
7,416,093 B2 * 8/2008 Lin et al. ................. 220/254.5

* cited by examiner

*Primary Examiner*—Walter Benson
*Assistant Examiner*—David S Luo
(74) *Attorney, Agent, or Firm*—Law Offices of Steven R. Olsen, PLLC; Steven R. Olsen

(57) ABSTRACT

Embodiment of the invention relate to a container. In one respect, embodiments of the invention provide a container that is useful in advertising because of its distinctive shape and faux pull ring, and/or because it is configured to output a jingle or other stored audio. Moreover, in embodiments of the invention, the container is configured as a cooler with a thermal insulator. Such a cooler may also include an automatic lid mechanism that allows for hands-free operation by users that seek to retrieve, for instance, a cold beverage from the cooler.

19 Claims, 6 Drawing Sheets

CONTAINER WITH AUTOMATED LID FEATURE

BACKGROUND

1. Field of the Invention

The invention relates generally to a container, and more particularly, but without limitation, to a container with an automated lid feature.

2. Description of the Related Art

Trash and other containers with mechanized lids are known. But such containers typically require manual intervention to activate the lid mechanism and to maintain the lid in an open state. Moreover, the utility of known containers is limited. For at least the foregoing reasons, improved containers are needed.

SUMMARY OF THE INVENTION

Embodiments of the invention seek to overcome one or more of the shortcomings described above.

In one respect, embodiments of the invention provide a container that is useful in advertising because of its distinctive shape and faux pull ring, and/or because it is configured to output a jingle or other stored audio. Moreover, in embodiments of the invention, the container is configured as a cooler with a thermal insulator. Such a cooler may also include an automatic lid mechanism and/or a delay feature that allows for hands-free operation by users that seek to retrieve, for instance, a cold beverage from the cooler.

BRIEF DESCRIPTION OF THE DRAWINGS

The invention will be more fully understood from the detailed description below and the accompanying drawings, wherein.

DETAILED DESCRIPTION

Figure 1B:
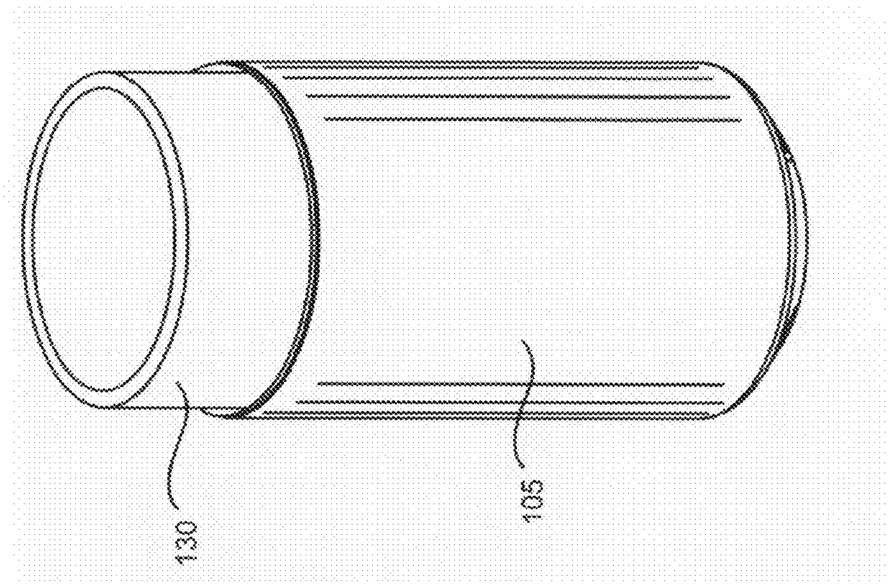
FIG. 1B is a perspective view drawing of a portion of the container illustrated in FIG. 1A, according to an embodiment of the invention.

The invention will now be described more fully with reference to FIGS. 1A through 4C, in which embodiments of the invention are shown. This invention may, however, be embodied in many different forms and should not be construed as limited to the embodiments set forth herein. In the drawings, reference designators may be duplicated for the same or similar features.

Figure 1A:
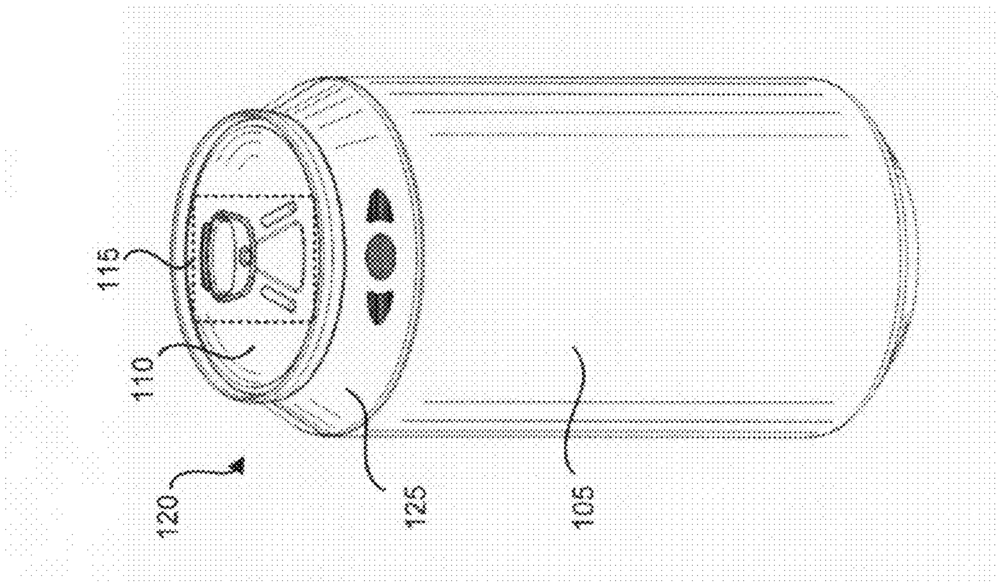
FIG. 1A is a perspective view drawing of a container, according to an embodiment of the invention.

FIG. 1A is a perspective view drawing of a container, according to an embodiment of the invention. In the illustrated embodiment, the container includes a body 105 that is coupled to a lid assembly 120. The body 105 is substantially cylindrical. Preferably, the lid assembly 120 may be easily separated from the body 105. The lid assembly 120 may include a lid 110 that has a faux pull ring 115. The faux pull ring 115 may be, for instance, embossed on the lid 110. The configuration of the faux pull ring may be varied, according to design choice.

The size of the container may be much larger than a typical beverage can. For example, the container may have an 8 gallon capacity or a 13 gallon capacity, although the invention is not limited to these exemplary proportions. The overall shape of the container, and esp. in combination with the faux pull ring 115, give the container the appearance of a beverage can. This distinctive shape may facilitate use of the container as an advertising medium.

FIG. 1B is a perspective view drawing of a portion of the container illustrated in FIG. 1A, according to an embodiment of the invention. FIG. 1B shows an optional body liner 130. In FIG. 1B, the body liner 130 is a removable component of the container, and is shown partially extracted from the body 105. The body liner 130 may be a thermal insulator and may be constructed, for instance, of polystyrene. The body liner 130 may be substantially cylindrical in shape, having a hollow middle portion and a closed bottom portion (e.g., an end of the body liner 130 that is not visible in FIG. 1B).

In the illustrated embodiment, the removable body liner 130 could support alternative applications for the container. For instance, with the body liner 130 installed, the container may be used as a beverage cooler. Absent the body liner 130, the container may be used as a trash can.

In an alternative embodiment of the invention (not shown), the container is configured such that the body liner 130 is not easily removed from the body 105.

Figure 2:
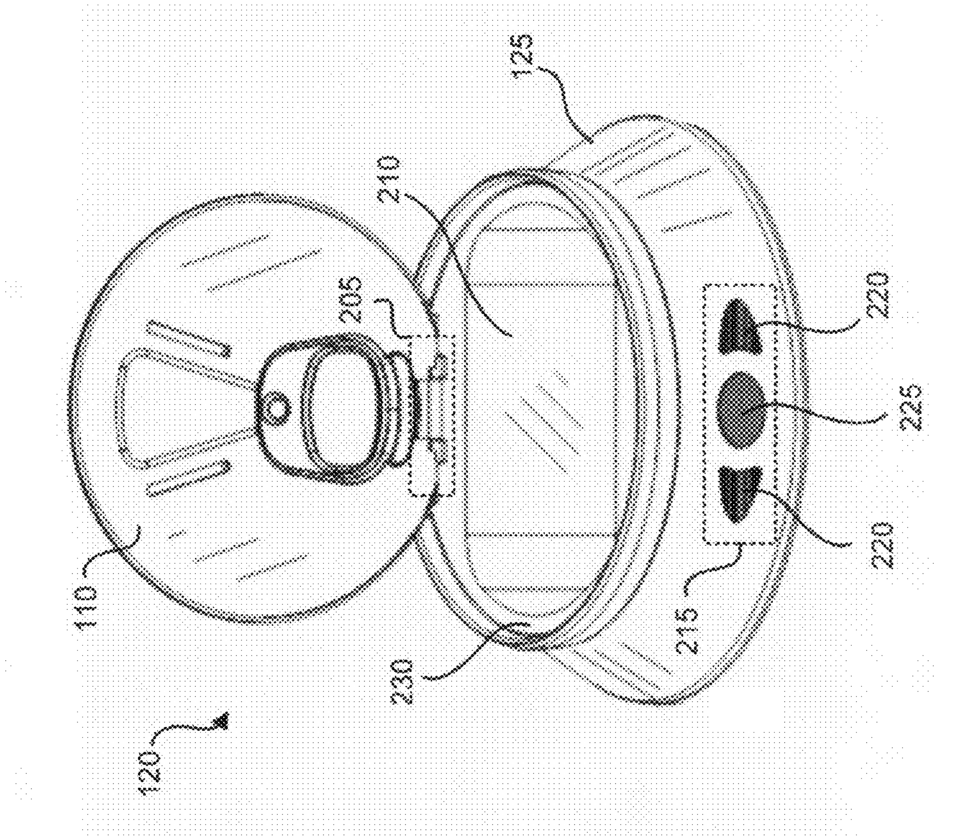
FIG. 2 is a perspective view drawing of a lid assembly, according to an embodiment of the invention.

FIG. 2 is a perspective view drawing of a lid assembly 120, according to an embodiment of the invention. The illustrated lid assembly 120 includes a collar assembly 125 that is coupled to the lid 110 by a powered hinge 205. The collar assembly 125 includes a housing 210, an internal liner 230 and a control panel 215.

The housing 210 may encase one or more system components (not shown in FIG. 2) such as a controller, a motor, a motor driver, and/or a power source, which are described below with reference to FIG. 3. Additionally, the powered hinge 205 may include a spring (such as a torsion spring, not shown) that is configured to reduce the amount of force needed to open and close the lid 110.

In embodiments of the invention, the internal liner 230 may be or include a thermal liner and may be constructed of polystyrene or other suitable thermal insulator. Embodiments that include a thermal internal liner 230 and a thermal body liner 130 configure the container as a cooler. As described above, container embodiments that only include the thermal body liner 130 may also be used as a cooler.

In the embodiment illustrated in FIG. 2, the control panel 215 includes manual switches 220 and a sensor 225. The manual switches 220 may include, for instance, one switch for opening the lid 110 and another switch for closing the lid 110. The sensor 225 may be or include, for example, an infrared (IR) sensor that is configured to detect the presence of a human being that is proximate to the container. In alternative embodiments, the sensor 225 could be or include, for example, an ultrasonic sensor, a microwave sensor, a Charge-Coupled Device (CCD) imaging device, or other sensing or imaging device.

Variations to the configuration of the container illustrated in FIGS. 1A, 1B, and 2 and described above are possible. For instance, in an alternative embodiment, the faux pull ring 115 may not appear on an underside of the lid 110. Moreover, in another embodiment, the lid assembly 120 may not be easily removed from the body 105. In addition, in another embodiment, the control panel 215 may include only the sensor 225, only the switches 220, or only a single switch 220, according to application needs. The body 105 may include a drain plug or spigot (not shown) in a lower portion of the body 105 to facilitate draining. Such a plug or spigot may be advantageous, for example, where the container is used as a cooler and ice is stored therein.

Figure 3:
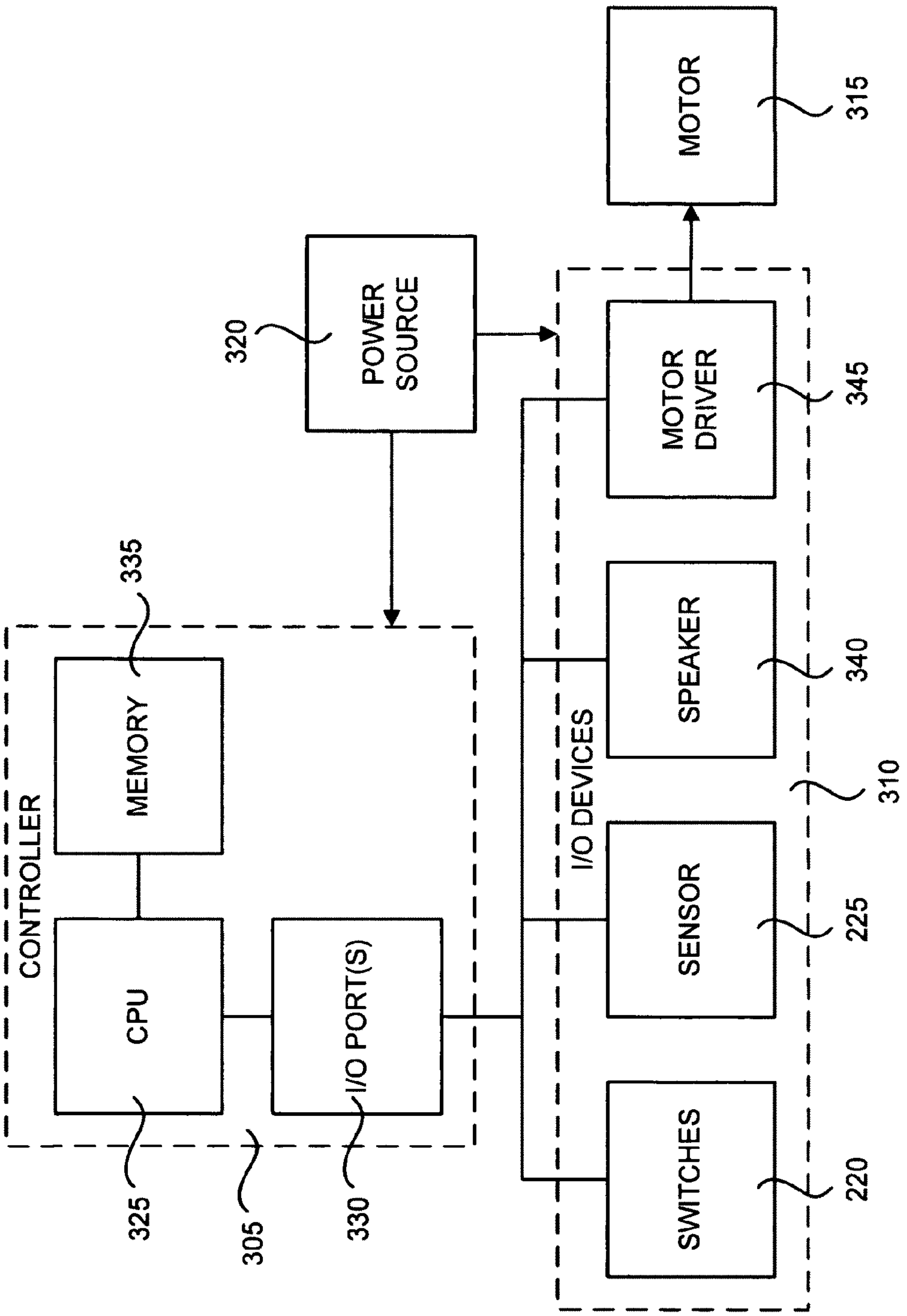
FIG. 3 is a functional block diagram of a system for use with a container, according to an embodiment of the invention.

FIG. 3 is a functional block diagram of a system for use with a container, according to an embodiment of the invention. The illustrated system includes a controller 305 coupled to input/output (I/O) devices 310. A power source 320 may also be coupled to the controller 305 and the I/O devices 310.

The controller 305 may include I/O port(s) 330 and memory 335, both coupled to a Central Processing Unit (CPU) 325. The memory 335 may be or include, for example, nonvolatile memory such as Read-Only Memory (ROM), flash memory, a Hard Disc (HD) drive, or a Compact Disc (CD) drive. The I/O devices 310 may include one or more of switches 220, sensor 225, speakers 340, and motor driver 345. In alternative embodiments, the I/O devices 310 include one or more sensor switches (not shown), for example a sensor switch that senses when the lid 110 is opened and/or a sensor switch that senses when the lid 110 is closed.

The motor driver 345 may be coupled to a motor 315. The motor 315 may be or include, for example, a direct current (DC) motor, and the motor 315 may be a component of the powered hinge 205. The motor driver 345 is configured to supply the necessary power to operate the motor 315. The motor driver 345 may also be configured to protect the controller 305 from electrical spikes generated by the motor 315.

The power source 320 may be or include, for instance, one or more batteries, filters, chargers, and/or an AC-to-DC power supply.

In operation, the memory 335 may store code for execution by the CPU 325. A method for controlling the motor driver 345 may be embodied in the code. For example, the controller 305 may be configured to activate the motor driver 345 based on inputs received from the switches 220, sensor 225, and/or sensor switches (not shown). Such action indirectly opens or closes the lid 110.

The memory 335 may also store audio data, and the code may embody a method for reading the audio data from the memory 335 and outputting the audio data to the speaker 340. The controller 305 may be configured to read and output the audio data, for instance, according to inputs received from the switches 220, sensor 225, and/or other predetermined conditions.

Figure 4A:
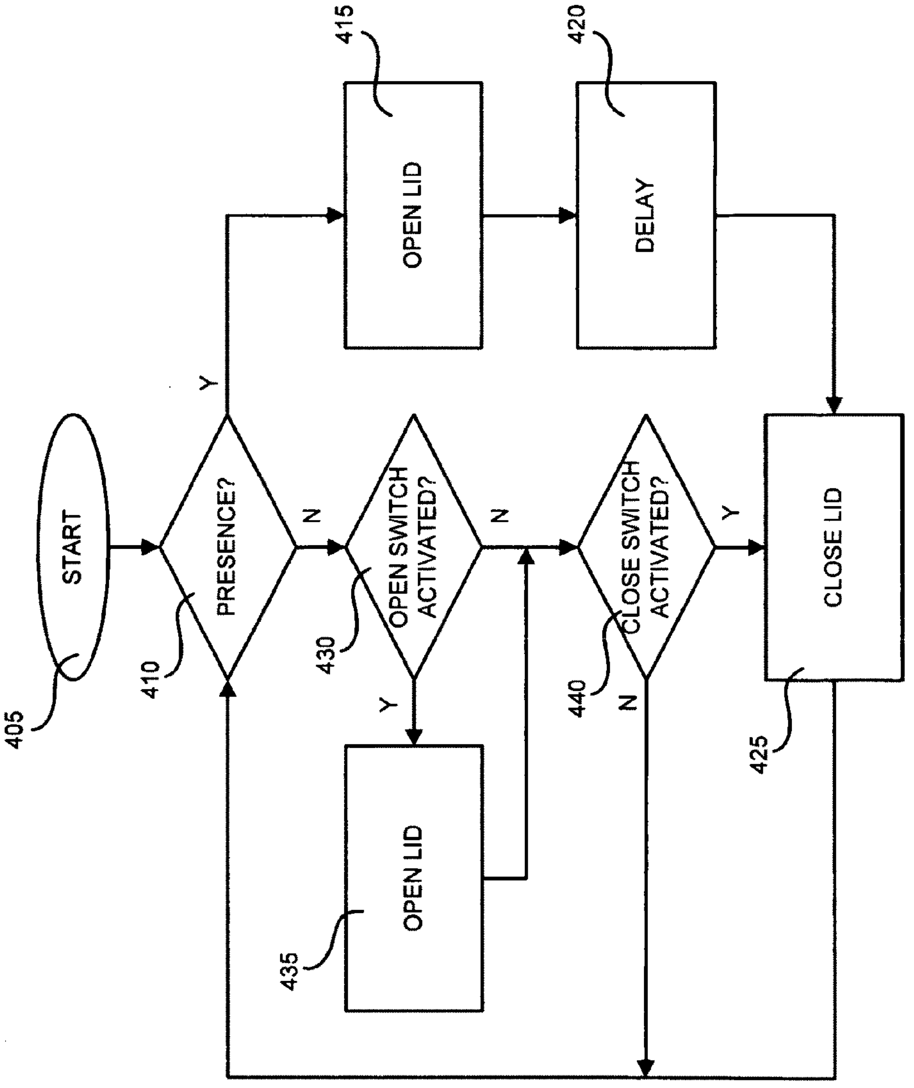
FIG. 4A is a flow diagram of a control process for use with a container, according to an embodiment of the invention.
Figure 4B:
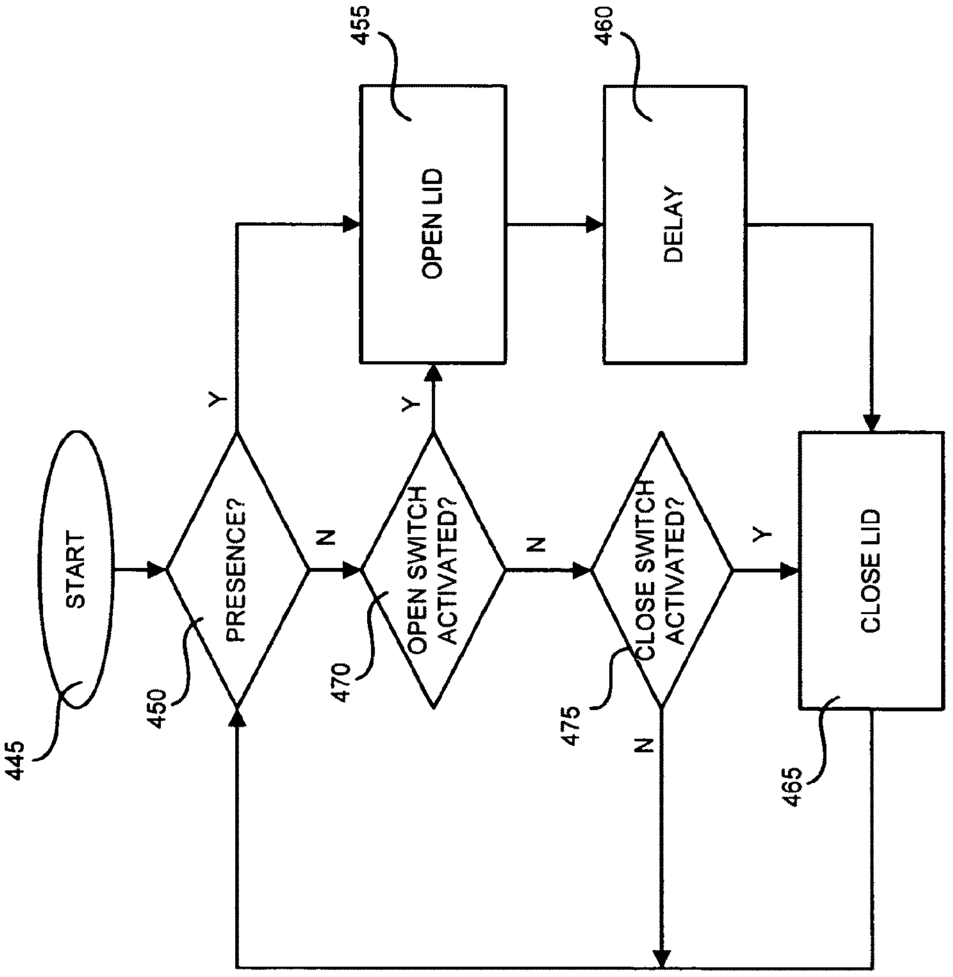
FIG. 4B is a flow diagram of a control process for use with a container, according to another embodiment of the invention.
Figure 4C:
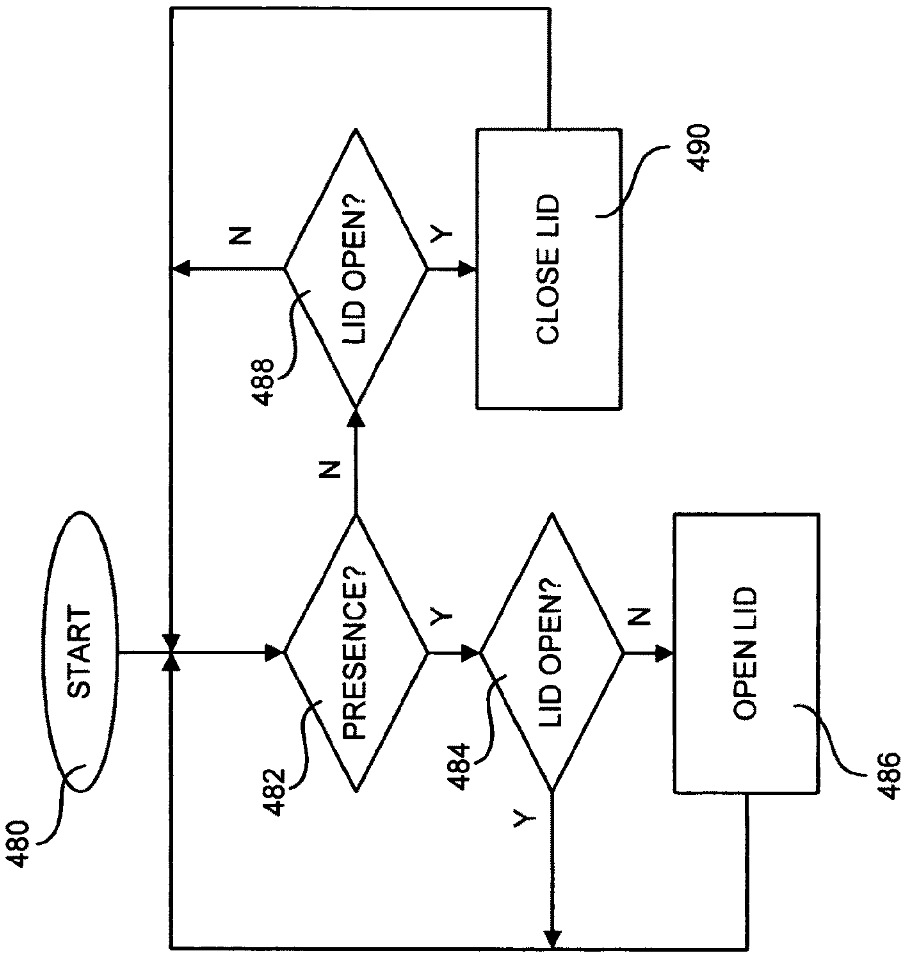
FIG. 4C is a flow diagram of a control process for use with a container, according to yet another embodiment of the invention.

FIGS. 4A-4C illustrate alternative control methods that can be embodied in code that is stored in the memory 335.

FIG. 4A is a flow diagram of a control process for use with a container, according to an embodiment of the invention. The illustrated process begins in step 405 and then determines whether a human being is present in conditional step 410. Conditional step 410 may be informed, for example, by the sensor 225. Where the result of conditional step 410 is in the affirmative, the process opens the container lid in step 415, waits for a predetermined delay in step 420, closes the lid in step 425, and then returns to conditional step 410.

Where the result of conditional step 410 is in the negative, the process advances to conditional step 430 to determine whether an open switch is activated. The open switch may be, for instance, one of the switches 220. Where the result of conditional step 430 is in the negative, the process advances to conditional step 440. Where the result of conditional step 430 is in the affirmative, the process opens the lid in step 435 before advancing to conditional step 440.

In conditional step 440, the process determines whether a close switch is activated. The close switch may be, for instance, another one of the switches 220. Where the result of conditional step 440 is in the affirmative, the process closes the lid in step 425 and then returns to conditional step 410. Where the result of conditional step 440 is in the negative, the process returns to conditional step 410.

The process in FIG. 4A thus opens the lid for a predetermined delay time when automatically sensing a human being. Alternatively, the process in FIG. 4A opens and closes the lid according to manual switch input.

FIG. 4B is a flow diagram of a control process for use with a container, according to another embodiment of the invention. The illustrated process begins in step 445 and then determines whether a human being is present in conditional step 450. Conditional step 450 may be informed, for example, by the sensor 225. Where the result of conditional step 450 is in the affirmative, the process opens the container lid in step 455, waits for a predetermined delay in step 460, closes the lid in step 465, and then returns to conditional step 450.

Where the result of conditional step 410 is in the negative, the process advances to conditional step 470 to determine whether an open switch is activated. The open switch may be, for instance, one of the switches 220. Where the result of conditional step 470 is in the negative, the process advances to conditional step 475. Where the result of conditional step 470 is in the affirmative, the process opens the lid in step 455, waits for a predetermined delay in step 460, closes the lid in step 465, and then returns to conditional step 450.

In conditional step 475, the process determines whether a close switch is activated. The close switch may be, for instance, another one of the switches 220. Where the result of conditional step 475 is in the affirmative, the process closes the lid in step 465 and then returns to conditional step 450. Where the result of conditional step 475 is in the negative, the process returns to conditional step 450.

The process in FIG. 4B thus opens the lid for a predetermined delay time when automatically sensing a human being or when the open switch is activated. The process in FIG. 4B also closes the lid according to manual switch input.

FIG. 4C is a flow diagram of a control process for use with a container, according to yet another embodiment of the invention. The illustrated process begins in step 480 and then determines whether a human being is present in conditional step 482. Conditional step 482 may be informed, for example, by the sensor 225. Where the result of conditional step 482 is in the affirmative, the process advances to conditional step 484 to determine whether the lid is open. Where the result of conditional step 484 is in the affirmative, the process returns to conditional step 482. Where the result of conditional step 484 is in the negative, the process opens the lid in step 486 and then returns to conditional step 482.

Where the result of conditional step 482 is in the negative, the process advances to conditional step 488 to determine whether the lid is open. Where the result of conditional step 488 is in the negative, the process returns to conditional step 482. Where the result of conditional step 488 is in the affirmative, the process closes the lid in step 490 and then returns to conditional step 482.

The process illustrated in FIG. 4C is thus fully automatic. The process in FIG. 4C opens the lid when a human is present and maintains the lid in an open state so long as the human is present. Conversely, the process in FIG. 4C closes the lid when a human is not present and maintains the lid in a closed state so long as no human is present.

It will be apparent to those skilled in the art that modifications and variations can be made without deviating from the spirit or scope of the invention. For example, alternative features described herein could be combined in ways not explicitly illustrated or disclosed. Thus, it is intended that the present invention cover any such modifications and variations of this invention provided they come within the scope of the appended claims and their equivalents.

I claim:

1. A container comprising:
- a body having a first thermal insulating layer on an inner surface of the body; and
- a lid assembly removably coupled to an open end of the body, the lid assembly including:
  - a lid;
  - a collar assembly;
  - a powered hinge, the powered hinge coupled between the lid and the collar assembly;
  - a controller;
- a plurality of input/output (I/O) devices coupled to the controller;
- a motor coupled to the plurality of I/O devices, the powered hinge including the motor; and
- a power source coupled to the controller and the plurality of I/O devices.

2. The container of claim 1, wherein the body is substantially cylindrical in shape.

3. The container of claim 1, wherein the body includes a drain plug.

4. The container of claim 1, wherein the first thermal insulating layer includes polystyrene.

5. The container of claim 1, wherein the collar assembly includes a second thermal insulating layer on an inner surface of the collar assembly.

6. The container of claim 5, wherein the second thermal insulating layer is polystyrene.

7. The container of claim 1, wherein the first thermal insulating layer is removable.

8. The container of claim 7, wherein the removable first thermal insulating layer is polystyrene.

9. The container of claim 1, wherein the controller includes:
- a central processing unit (CPU);
- a nonvolatile memory device coupled to the CPU; and
- at least one I/O port coupled to the CPU, the nonvolatile memory device configured to store code, the central processing unit configured to execute the code based on at least one signal received from the at least one I/O port.

10. The container of claim 1, wherein the plurality of I/O devices includes:
- a sensor configured to sense a human in proximity of the container; and
- a motor driver configured to control the powered hinge, the container controller configured to open the lid when the human is sensed.

11. The container of claim 10, wherein the sensor is an infrared (IR) sensor.

12. The container of claim 10, wherein the sensor is an ultrasonic sensor.

13. The container of claim 10, wherein the controller is further configured, after opening the lid, to wait a predetermined time and then close the lid.

14. The container of claim 10, wherein the controller is further configured, after opening the lid, to close the lid after the human is no longer sensed.

15. The container of claim 1, wherein the plurality of I/O devices includes a first switch, the container configured to open the lid when the first switch is activated.

16. The container of claim 15, wherein the plurality of I/O devices includes a second switch, the container configured to close the lid when the second switch is activated.

17. The container of claim 1, wherein the plurality of I/O devices includes a speaker, the nonvolatile memory device configured to store audio data.

18. The container of claim 17, wherein the controller is configured to stream the audio data to the speaker concurrently with opening the lid.

19. The container of claim 1, wherein the power source includes a battery.

* * * * *